United States Patent Office 3,426,020
Patented Feb. 4, 1969

3,426,020
SYNTHESIS OF 2-SUBSTITUTED
PHENOTHIAZINES
Frank A. Dondzila, East Brunswick, Albert R. Restivo, Belleville, and Harry L. Yale, New Brunswick, N.J., assignors to E. R. Squibb & Sons, Inc., New York, N.Y., a corporation of Delaware
No Drawing. Filed Dec. 1, 1966, Ser. No. 598,163
U.S. Cl. 260—243                                     7 Claims
Int. Cl. C07d 93/14

ABSTRACT OF THE DISCLOSURE

This invention relates to the preparation of 2-substituted phenothiazines by a process which comprises refluxing a 2-acylamido-4-substituted-2'-nitrodiphenylsulfide in the presence of a basic condensing agent and a solvent which is aprotic under the reaction conditions.

---

This invention relates to an improved process for preparing 2-substituted phenothiazines.

The 2-substituted phenothiazines are known compounds having numerous uses; one of which being as intermediates in the preparation of the physiologically active 10-aminoalkyl derivatives. Prior to this invention, these 2-substituted phenothiazines were prepared by a number of processes, all of which suffer commercially important disadvantages. Thus, according to one process, the 2-substituted phenothiazines were prepared from a 2-acylamino - 4 - substituted-2',4'-dinitrodiphenylsulfide by a Smiles Rearrangement followed by cyclization and hydrolysis. In this process, however, there was obtained a 2-substituted-7-nitrophenothiazine so that the nitro group had to be removed by reduction and deamination, thus adding two extra steps to the process. According to another process, a 3-substituted-diphenylamine was thionated to yield a mixture of the desired 2-substituted phenothiazine and the undesired 4-substituted isomer, which mixture is difficult to separate.

In accordance to the process of this invention, a 2-substituted phenothiazine of the Formula I:

(I)
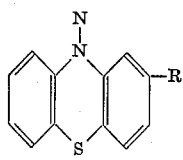

wherein R is halo (preferably chloro and fluoro), lower alkyl, lower alkoxy, halo(lower alkyl) (preferably perhalo-lower alkyl), such as (trifluoromethyl), lower alkyl mercapto, halo(lower alkyl)mercapto (preferably trifluoromethylmercapto), halo(lower alkoxy) (preferably trifluoromethoxy), (lower alkyl)sulfonyl, amidosulfonyl, lower alkanoyl (e.g., acetyl and octanoyl), cyano and isocyano, is obtained by cyclizing a compound of the Formula II:

(II)
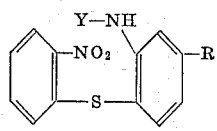

wherein R is as hereinbefore defined, and Y is acyl, under certain critical conditions, as hereinafter detailed.

The compounds of Formula II can be prepared in two steps. In the first step, 2-nitrochlorobenzene is reacted with the zinc salt of a 2-amino-4-substituted-benzenethiol; the reaction preferably being carried out in the presence of a basic reagent, such as an alkali metal hydroxide (e.g., sodium hydroxide), a metal alcoholate (e.g., sodium methoxide), or a metal carbonate (e.g., sodium carbonate) to yield compounds corresponding to those of Formula II, wherein Y is hydrogen.

Among the suitable zinc salts of 2-amino-4-substituted-benzenethiols can be mentioned the zinc salts of 2-amino-4 - halobenzenethiols (e.g., 2-amino-4-chlorobenzenethiol and 2 - amino - 4-fluorobenzenethiol); 2-amino-4-(lower alkyl)benzenethiols (e.g., 2-amino-4-methylbenzenethiol, 2 - amino-4-ethylbenzenethiol, and 2-amino-4-n-hexylbenzenethiol); 2-amino-4-(lower alkoxy)benzenethiols (e.g., 2-amino-4-methoxybenzenethiol and 2-amino-4-propoxybenzenethiol); 2 - amino-4-halo(lower alkyl)benzenethiols (e.g., 2-amino-4-trifluoromethylbenzenethiol); 2-amino-4-(lower alkyl)mercaptobenzenethiols (e.g., 2 - amino-4-methylmercaptobenzenethiol); 2 - amino - 4-halo(lower alkyl)mercaptobenzenethiols (e.g., 2 - amino-4-trifluoromethylmercaptobenzenethiol); 2-amino-4-halo(lower alkoxy)benzenethiols (e.g., 2 - amino-4 - trifluoromethoxybenzenethiol); 2 - amino-4-(lower alkyl)sulfonylbenzenethiols (e.g., 2 - amino-4-methylsulfonylbenzenethiol); 2-amino - 4 - amidosulfonylbenzenethiol, 2-amino-4-(lower alkanoyl)benzenethiols (e.g., 2 - amino-4-acetylbenzenethiol and 2-amino-4-octanoylbenzenethiol); 2-amino-4-cyanobenzenethiol, and 2 - amino - 4-isocyanobenzenethiol. The zinc salt of 2-amino-4-(trifluoromethyl)benzenethiol is the preferred reactant.

In the second step, the compounds of Formula II (wherein Y is acyl) are prepared by treating compounds corresponding to those of Formula II, wherein Y is hydrogen, with formic acid, an acid anhydride or an acyl halide to yield the amido derivatives. The preferred anhydrides and acyl halides are the anhydride and acyl chlorides of hydrocarbon carboxylic acids of less than twelve carbon atoms, as exemplified by the lower alkanoic acids (e.g., acetic, propionic and butyric acid), the lower alkenoic acids, the monocyclic aryl carboxylic acids (e.g., benzoic acid), the monocyclic aryl lower alkanoic acids (e.g., phenylacetic acid), the cycloalkanecarboxylic acids, and the cycloalkenecarboxylic acids. The amides of Formula II are formed by treating the amines of Formula II with formic acid, an acyl halide or acid anhydride under the usual conditions. The preferred process of this invention entails the step of converting the amines of Formula II to a formamide (Y is CHO) by treating the amine with formic acid at an elevated temperature, such as reflux.

Compounds II are then reacted to yield the final products of Formula I. The solvent used in the ring closure of the compound of Formula II to yield the product of Formula I is critical, for if conventional solvents customarily used in Smiles Rearrangement-cyclization reactions are employed, either no product or a very poor yield of product is obtained. Thus, if an attempt is made to carry out the reaction in acetone no reaction takes place. If, however, an aprotic solvent (e.g., a solvent lacking "active" hydrogen atoms) is used, the desired product is obtained in high yield. Examples of suitable aprotic solvents include high boiling aprotic solvents such as the N,N-di(lower alkyl)(lower alkonoic acid)amides (e.g., N,N-dimethylformamide and N,N-dimethylacetamide), the di(lower alkyl)sulfoxides (e.g., dimethylsulfoxide), the di(lower alkyl)sulfones (e.g., dimethylsulfone), the (lower alkenylene)sulfones (e.g., sulfolene), and the (lower alkylene)-sulfones (e.g., sulfolane). The preferred solvent is an N,N-di(lower alkyl)(lower alkanoic acid)amide; optimally N,N-dimethylformamide.

The reaction is carried out without a catalyst, such as copper powder. The reaction is preferably conducted in the presence of a basic condensing agent, e.g., an alkali metal carbonate, such as potassium carbonate, or an alkali metal hydroxide, such as sodium hydroxide. The preferred temperature of the reaction is the reflux temperature of the reaction medium. However, temperatures in the range of about 100° C. to about 140° C. can be used.

The following examples illustrate the invention (all temperatures being in centigrade):

EXAMPLE 1

2-amino-4-(trifluoromethyl)-2'-nitrodiphenylsulfide (a) Preparation of bis - [2 - nitro - 4-(trifluoromethyl)-phenyl]disulfide.—2.25 kg. of 3-nitro-4-chlorobenzotrifluoride is dissolved in 6.3 l. of isopropanol at room temperature. The resulting solution is heated with agitation to reflux. The heating is stopped and a 35° solution of 1.25 kg. of sodium sulfide (Na$_2$S·9H$_2$O) and 0.166 kg. of precipitated sulfur in 0.625 l. of H$_2$O is added as rapidly as reflux will allow. The accompanying reaction is exothermic, therefore, cooling water is applied to the reaction flask in order to speed up the addition rate. The internal reaction temperature is maintained at 75–82° by this procedure. Upon completion of addition, the reaction mixture is refluxed with agitation for ½ to 1 hour after which it is cooled at 5° for 4 hours. The precipitate, a mixture of product and salt, is filtered and is washed with 2 l. of cold (5°) isopropanol, after which it is suspended in 15 l. of water and agitated at room temperature for ½ hour. The product is then filtered, washed well with water and dried at 65° for 24 hours to afford 2.1 kg. of yellow solids, M.P. 160–162°.

(b) Preparation of the zinc salt of 2-amino-4-(trifluoromethyl)benzenethiol.—2.1 kg. of bis-[2-nitro-4-(trifluoromethyl)phenyl]disulfide is dissolved with agitation in 12.0 l. of dioxane at room temperature. A total of 2.6 kg. of zinc dust is added and the resulting mixture is warmed with agitation to 30°. A total of 8.6 l. of concentrated hydrochloric acid is added over a period of 3 hours while maintaining efficient agitation. The temperature holds at 25–40° without external cooling. Upon completion of the addition, the reaction mixture is held for 3–4 hours at 20–30° to consume excess zinc. The mixture is filtered from insoluble material and the product is precipitated by the adjustment of the pH to 4.5–5.0 by the addition of 50% sodium acetate solution in a steady stream (ca. 18 l. required). The resulting mixture is filtered on an oversized funnel and washed well with water. The wet cake is not dried but is used as such in the next step. Yield: 6.2 kg. of wet cake. T.V. equals 66%, therefore, the dry cake is ca 2.01 kg.

(c) Preparation of 2-amino-4-(trifluoromethyl)-2'-nitrodiphenylsulfide.—6.2 kg. of the wet zinc salt of 2-amino-4-(trifluoromethyl)benzenethiol obtained in step b [representing about 2.01 kg. on a dry basis] is suspended with agitation in 5.4 l. of isopropanol. A 20° solution of 0.405 kg. of sodium hydroxide in 1.2 l. of water is added in a steady stream. The resulting almost clear solution is warmed to 40° where a solution of 1.41 kg. of o-nitrochlorobenzene in 3.2 l. of isopropanol is introduced. The reaction is heated with agitation to reflux, where it is held for 4 hours. Heating is discontinued and the hot reaction mixture is filtered through Hyflo. A layer of water which separates from the filtrate is drawn off and discarded. The isopropanol filtrate is concentrated to a syrupy residue. The residue, which weighs about 3.2 kg., is extracted into 18 l. of reflux 75% ethanol. The hot solution is filtered and agitated at a slow speed until crystallization occurs. The crystalline mixture is then cooled to 5° where it is held under agitation for 3 hours. The product is filtered and the cake is washed well with hexane. The wet cake is dried at 35° under vacuum to afford about 1.86 kg. of orange colored solids, M.P., 90–92°.

Similarly, by substituting the indicated 4-R-substituted-2-nitrochlorobenzene reactant for the 3-nitro-4-chlorobenzotrifluoride in step a of Example 1 and following the procedure of the example, the indicated 2-amino-4-R-substituted-2'-nitro-diphenylsulfide product is obtained:

| Example | Reactant (R is) | Product (R is) |
|---|---|---|
| 2 | Chloro | Chloro. |
| 3 | Fluoro | Fluoro. |
| 4 | Methyl | Methyl. |
| 5 | Methoxy | Methoxy. |
| 6 | Methylmercapto | Methylmercapto. |
| 7 | Trifluoromethylmercapto | Trifluoromethylmercapto. |
| 8 | Trifluoromethoxy | Trifluoromethoxy. |
| 9 | Methylsulfonyl | Methylsulfonyl. |
| 10 | Acetyl | Acetyl. |
| 11 | Cyano | Cyano. |
| 12 | Isocyano | Isocyano. |

EXAMPLE 13

2-formamido-4-(trifluoromethyl)-2'-nitro-diphenylsulfide 1.86 kg. of 2-amino-4-(trifluoromethyl)-2'-nitro-diphenylsulfide is suspended in 9.3 l. of 88% formic acid at room temperature. The resulting mixture is heated with agitation for 1 hour, after which the heating is discontinued, and the batch is allowed to cool slowly until precipitation occurs. The mixture is cooled further to 20° where a total of 9.3 l. of water is added in a steady stream. After a 1 hour cooling period at 5°, the product is filtered, washed well with water and dried at 65° to afford about 1.98 kg. of greenish-yellow solids, M.P., 171–173°.

EXAMPLE 14

2-acetamido-4-(trifluoromethyl)-2'-nitro-diphenylsulfide 10 g. of 2-amino-4-(trifluoromethyl-2'-nitro-diphenylsulfide is dissolved in a mixture of 2 ml. of aectic anhydride and 25 ml. acetyl chloride. The resulting solution is refluxed for 8 hours after which it is concentrated in vacuo to a crystalline residue. The residue is triturated with hexane to afford 11.75 g. of product.

Similarly, by following the procedures of Examples 13 and 14, but substituting the indicated 2-amino-4-R-substituted-2'-nitrodiphenylsulfide reactant for the 2-amino-4-(trifluoromethyl)-2'-nitro-diphenylsulfide, the indicated 2-formamido-4-R-substituted-2'-nitro-diphenylsulfide and 2-acetamido-4-R-substituted-2'-nitro-diphenylsulfide are formed, respectively:

| Example | Reactant (R is) | Product (R is) |
|---|---|---|
| 15 | Chloro | Chloro. |
| 16 | Fluoro | Fluoro. |
| 17 | Methyl | Methyl. |
| 18 | Methoxy | Methoxy. |
| 19 | Methylmercapto | Methylmercapto. |
| 20 | Trifluoromethylmercapto | Trifluoromethylmercapto. |
| 21 | Trifluoromethoxy | Trifluoromethoxy. |
| 22 | Methylsulfonyl | Methylsulfonyl. |
| 23 | Acetyl | Acetyl. |
| 24 | Cyano | Cyano. |
| 25 | Isocyano | Isocyano. |

EXAMPLE 26

2-(trifluoromethyl)phenothiazine 1.98 kg. of 2-formamido-4-(trifluoromethly)-2'-nitro-diphenylsulfide is dissolved with agitation in 20 l. of N,N-dimethylformamide at room temperature. A total of 3.2 kg. (23.1 moles) of freshly ground potassium carbonate is introduced. The mixture is heated with agitation, to reflux, where it is held for 2 hours. Heating is discontinued and the mixture is cooled to 30°, filtered through Hyflo, and the filtrate is concentrated to a semi-solid residue. The residue, which weighs about 1.8 kg., is extracted into 48 l. of refluxing chloroform. The extract is filtered from a small amount of insolubles and is concentrated, at atmospheric pressure, to a volume of 17 l. The concentrate is agitated slowly at room temperature until crystallization occurs, after which it is cooled to 5° and held for 12–18 hours. The product is filtered, washed with hexane and dried at 65° to afford 1.2 kg. of yellow platelets, M.P. 189–191° of pure (>99.9%) 2-(trifluoromethyl)phenothiazine. The mother liquor from the above (1.2 kg.) is concentrated to one-half volume to give 80 g. additional of 2-(trifluoromethyl)phenothiazine. The total yield is 1.28 kg.

Moreover, if N,N-dimethylacetamide or dimethylsulfoxide is substituted for the N,N-dimethylformamide in the procedure of Example 26, 2-(trifluoromethyl)phenothiazine is obtained in good yield. However, if acetone and alcoholic potassium hydroxide is substituted for the N,N-dimethylformamide-potassium carbonate system, no desired product is obtained.

Similarly, by substituting any of the following 2-formamido-4-R-substituted-2'-nitro-diphenylsulfides for the 2-formamido-4-(trifluoromethyl)-2'-nitro-diphenylsulfide in the procedure of Example 26, the indicated 2-R-substituted phenothiazine is obtained, respectively:

| Example | Reactant (R is) | Product 2-(R-substituted)-phenothiazine (R is) |
| --- | --- | --- |
| 27 | Chloro | Chloro. |
| 28 | Fluoro | Fluoro. |
| 29 | Methyl | Methyl. |
| 30 | Methoxy | Methoxy. |
| 31 | Methylmercapto | Methylmercapto. |
| 32 | Trifluoromethylmercapto | Trifluoromethylmercapto. |
| 33 | Trifluoromethoxy | Trifluoromethoxy. |
| 34 | Methylsulfonyl | Methylsulfonyl. |
| 35 | Acetyl | Acetyl. |
| 36 | Cyano | Cyano. |
| 37 | Isocyano | Isocyano. |

EXAMPLE 38

10-acetyl-2-(trifluoromethyl)phenothiazine

A total of 11.75 g. of 2-acetamido-4-(trifluoromethyl)-2'-nitro-diphenylsulfide and 2.24 g. of anhydrous potassium carbonate is suspended in 120 ml. of N,N-dimethylformamide. The resulting mixture is refluxed for 2 hours, after which it is filtered and the filtrate concentrated in vacuo to a syrupy residue. The residue is distilled in vacuo to afford the desired product.

EXAMPLE 39

2-(trifluoromethyl)phenothiazine

The 10-acetyl-2-(trifluoromethyl)phenothiazine is heated in alcoholic KOH, then the 2-(trifluoromethyl)-phenothiazine is precipitated by adding water.

The invention may otherwise be embodied within the scope of the appended claims.

What is claimed is:

1. A process for preparing a 2-substituted phenothiazine which comprises refluxing a 2-acylamido-4-substituted-2'-nitrodiphenylsulfide in the presence of a basic condensing agent selected from the group consisting of an alkali metal carbonate and an alkali metal hydroxide and a solvent, wherein the 4-substituent is selected from the group consisting of halo, lower alkyl, lower alkoxy, trifluoromethyl, trifluoromethyl mercapto, lower alkyl mercapto, trifluoromethoxy, lower alkyl sulfonyl, amidosulfonyl, lower alkanoyl, cyano, and isocyano, wherein the acyl group is derived from a hydrocarbon carboxylic acid of less than twelve carbon atoms selected from the group consisting of the lower alkanoic acids, the lower alkenoic acids, the monocyclic aryl lower alkanoic acids, the cycloalkanecarboxylic acids, and the cycloalkenecarboxylic acids, and wherein the solvent is selected from the group consisting of a N,N-di(lower alkyl) (lower alkanoic acid)amide, a di(lower alkyl)sulfoxide, a di(lower alkyl)sulfones, a (lower alkenylene)sulfone, and a (lower alkylene)sulfone.

2. The process of claim 1, wherein the solvent is selected from the group consisting of N,N-dimethylformamide, N,N-dimethylacetamide, dimethylsulfoxide, dimethylsulfone, sulfolene, and sulfolane.

3. The process of claim 1, wherein 2-formamido-4-substituted-2'-nitro-diphenylsulfide, the 4-substituent being as set forth in claim 1, is used as the reactant.

4. The process of claim 2, wherein 2-formamido-4-(trifluoromethyl)-2'-nitro-diphenylsulfide is used as the reactant.

5. The process of claim 4, wherein the solvent is N,N-dimethylformamide.

6. The process of claim 5, wherein the reaction is carried out in the presence of an alkali metal carbonate.

7. The process of claim 3 wherein the 4-substituent is selected from the group consisting of halo, lower alkyl, lower alkoxy, halo lower alkyl, lower alkyl mercapto, halo lower alkyl mercapto, halo lower alkoxy, lower aky sufonyl, amidosulfonyl, lower alkanoyl, cyano, and isocyano, and wherein the acyl group is derived from a hydrocarbon carboxylic acid of less than twelve carbon atoms.

References Cited

UNITED STATES PATENTS 2,997,468  8/1961  Schwartz  260—243
2,919,272  12/1959  Craig  260—243

OTHER REFERENCES

Parker: Advances in Organic Chemistry, Methods and Results, vol. 5, pp. 2–8, Interscience Publications (New York) 1965.

HENRY R. JILES, *Primary Examiner.*

HARRY I. MOATZ, *Assistant Examiner.*

U.S. Cl. X.R.

260—429.9, 465, 556, 557, 558, 562, 575, 580